(12) United States Patent
Wirth

(10) Patent No.: US 6,588,553 B1
(45) Date of Patent: Jul. 8, 2003

(54) MULTI-DISC BRAKE PAD

(75) Inventor: Xaver Wirth, Ismaning (DE)

(73) Assignee: Knorr-Bremse Systeme für Schienenfahrzeuge GmbH, Munich (DE)

( * ) Notice: Subject to any disclaimer, the term of this patent is extended or adjusted under 35 U.S.C. 154(b) by 0 days.

(21) Appl. No.: 09/786,207
(22) PCT Filed: Aug. 19, 1999
(86) PCT No.: PCT/EP99/06062
§ 371 (c)(1), (2), (4) Date: May 21, 2001
(87) PCT Pub. No.: WO00/14421
PCT Pub. Date: Mar. 16, 2000

(30) Foreign Application Priority Data

Sep. 3, 1998 (DE) .......................... 198 40 064

(51) Int. Cl.[7] .............................. F16D 65/06
(52) U.S. Cl. .............. 188/250 B; 188/250 G
(58) Field of Search ............ 188/71.5, 234–236, 188/238–247, 250 B, 250 G

(56) References Cited

U.S. PATENT DOCUMENTS

| | | |
|---|---|---|
| 1,219,824 A | 3/1917 | Kinzer |
| 4,020,928 A | 5/1977 | Beetle .................. 188/237 |
| 4,781,275 A * | 11/1988 | Olsen .................. 188/251 A |

FOREIGN PATENT DOCUMENTS

| | | |
|---|---|---|
| DE | 1 127 940 | 4/1959 |
| DE | 2 418 024 | 4/1974 |
| DE | 30 33 936 | 9/1980 |
| EP | 0 026 578 | 8/1980 |

OTHER PUBLICATIONS

Abstract—St Jerna Sven, "Block Brake Assembly for the Wheel of a Railway Vehicle", Nov. 23, 1982.
Bremsen Fur Schienenfahrzeuge, Handbuch, Knorr–Bremse AG Munchen, Bremstechnische Begriffe 22–23 and 41.
Abstract—Yasuhiko Sawada, "Brake for Centrifugal Dehydrator", Jan. 17, 1989.

* cited by examiner

Primary Examiner—Christopher P. Schwartz
(74) Attorney, Agent, or Firm—Barnes & Thornburg

(57) ABSTRACT

The present invention relates to a brake pad for rail vehicles, including at least two friction material blocks and at least one holding device. The individual friction material blocks are lamellar in shape and are connected to one another along their longitudinal sides to form a brake pad. The connection is constructed such that the individual friction material blocks may be displaced with respect to one another. The present invention also relates to a rail vehicle brake including at least one brake shoe, a friction material block holding device, a power unit having a carrier body and a connection device connecting the power unit to the at least one brake shoe.

18 Claims, 6 Drawing Sheets

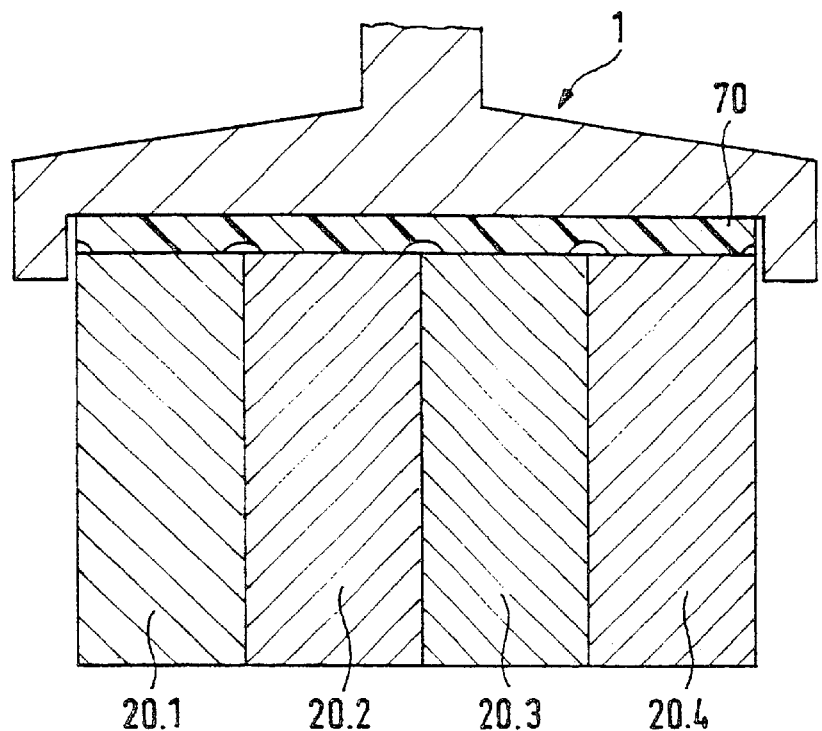
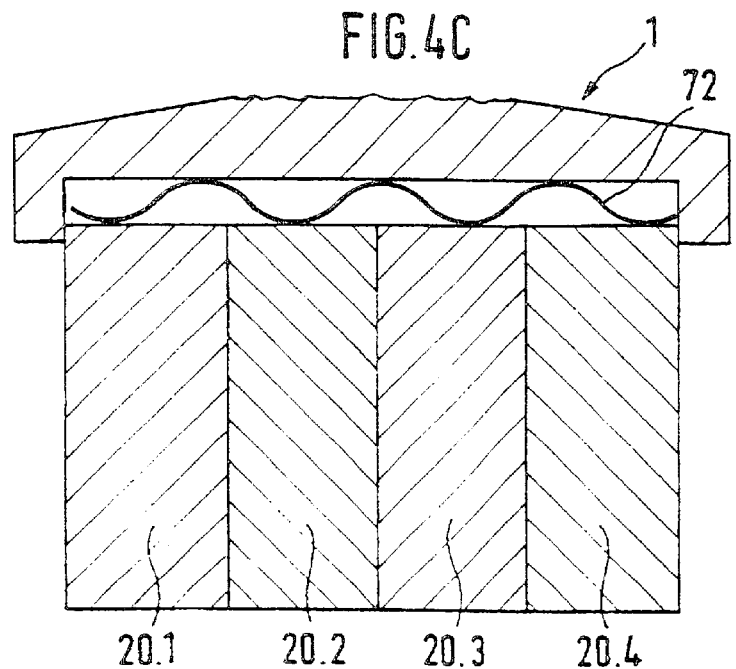

MULTI-DISC BRAKE PAD

BACKGROUND OF THE INVENTION

The invention relates to a brake pad, particularly for rail vehicles, comprising at least two friction material blocks. The invention also relates to a process for manufacturing such a brake pad, and also relates to a brake shoe, particularly for rail vehicles having such a brake pad.

Brake pads are used in pad brakes or pad brake units. Pad brakes are brakes in which a brake cylinder, lever transmission and an adjusting mechanism operate to press a brake pad onto the wheel running surface in order to achieve a braking effect. With respect to the further development of brake pad units in the case of rail vehicles, reference is made to "Brakes for Rail Vehicles", Handbook—Brake-Related Terms and Values, Knorr-Bremse AG München, 2nd Edition, 1990, Page 41.

The brake pads of the prior art are often constructed as a one piece friction material block. Materials of the brake pads or friction material blocks are perlitic cast iron with lamellar graphite, plastic material consisting of a mixture of different substances in an artificial resin bond or buna bond, or sintered material which consists of finest metal powder, such as iron, copper or nonferrous heavy metal.

U.S. Pat. No. 1,219,824, shows a brake pad which comprises a plurality of friction material blocks which are separated by an elastic layer. The individual friction material blocks are mounted transversely to the longitudinal direction of the brake shoe. As a result of this arrangement, the brake pad experiences only slight expansion changes in the event of fluctuating temperatures.

German Patent Document DE 24 18 024 shows a carbon-containing airplane brake disk consisting of a strong durable center core and brake linings which are fastened on both sides and are made of a light-weight material which is subject to wear. The materials which are subject to wear are connected with the center core by an adhesive layer.

Japanese Patent Document JP 55-97537, shows a brake pad which has a slotted construction in the longitudinal direction for reducing the braking noise. The reduction of the braking noise because the slotted construction allows higher temperatures on the braking area.

German Patent Document DE 30 33 936 shows a brake shoe with several brake pads which can be changed very easily.

British Patent Documents GB K 13850 and GB P 14036 show brake pads having lamellar friction material blocks which are connected on their longitudinal sides to form a brake pad. The brake pads were held together by a bolt connections extending transversely to the disk direction.

With respect to the constructions of brake pads, reference is also made, for example to "Brakes for Rail Vehicles", Handbook—Brake-Related Terms and Values, Knorr-Bremse AG München, 1990, Pages 22 to 23.

In the case of the above-described pad brake systems according to the prior art, the contact pattern is insufficient because of thermal expansions and axial displacements. In fact, the contact pattern is the poorer, the harder the material of the pad. The poor contact pattern results in the formation of corrugations or in cracking in the wheel running surfaces and therefore generates considerable noise during braking.

It is an object of the invention to provide a brake pad system or a component of a brake pad system by means of which the above-mentioned disadvantages can be overcome.

The brake pad according to the principles of the present invention comprises at least two friction material blocks. The individual friction material blocks are lamellar in shape, and are connected mechanically or by an elastic intermediate layer along their longitudinal sides to form a brake pad. As a result of the elastic intermediate layers between the individual friction material layers or the mechanical connections, the braking noise can be reduced because, during the braking, the friction between the individual friction material blocks absorbs noise energy.

Another advantage of the brake pad according to the invention is the fact that, in the case of a non-uniform wear of the wheel tire or during axial displacements, the individual disk stacks can shift in the vertical direction and thus adapt themselves to the running surface of the wheel, whereby an essentially identical surface pressure is always ensured irrespective of the axial position or the wear.

In a preferred embodiment, the elastic intermediate layer is an adhesive layer. As an alternative, the mechanical connection is a screwed, riveted or form-locking connection, particularly a clamp-type connection.

A brake pad comprises at least two, preferably three to four, disks situated side-by-side. The disks are mechanically or form-lockingly connected with one another along the longitudinal side.

In a preferred embodiment, a holding device fastening the friction material block to a brake shoe is provided for each friction material block. In the case of a lamellar construction of the friction material blocks, each disk has such a holding device on the side facing away from the wheel running surface and facing the brake shoe.

Preferably, the holding devices of the individual friction material blocks have a sheet metal reinforcement with integrated holding angles. The sheet metal reinforcement is non-detachably connected with the individual friction material block or the disk stacks, for example, by gluing. The sheet metal reinforcement transmits contact pressure force from the brake shoe to the friction material blocks and the contact pressure force is therefore introduced from the brake shoe to the brake pad. The holding angles for fix the brake pad on the brake shoe and protect against the falling-out or rattling of the individual friction material blocks.

The holding angles are preferably constructed as U-shaped leaf springs which are part of the reinforcement arranged on the friction material block. The invention also provides a process for producing such a brake-pad. According to the invention, the individual friction material blocks are obtained by being pressed or cut out of plates and are connected by gluing or by a mechanically elastic connection to form a brake pad, so that energy can be absorbed by the connection.

The invention also provides a brake shoe having such a brake pad. The brake shoe has a carrying body, a connection device to the power unit of the pad braking device for operating the brake shoe as well as a friction material block holding device. The friction material block holding device can be a guide rail which extends in the wheel turning direction.

The brake shoe according to the invention is exchangeable with conventional brake shoes because the connection of the inventive brake shoe is analogous to that of the conventional brake shoes.

In order to keep the individual forces of the friction material blocks of the multi-disk brake pad upon the wheel running surface constant, the guide rails may be constructed in the form of a balance beam guide rail system. The balance beam guide rail system supports a relative vertical displacement of the disks of the brake pad. This displacement is perpendicular to the wheel running surface. The balance beam system in combination with the multi-disk brake pad, in which the individual disks can be displaced in the vertical direction as a result of the mechanical or shear-elastic intermediate layer, therefore results in a very good contact pattern. This measure permits a higher loading capacity of the wheels and reduces the formation of corrugations or cracking and thus the development of noise when the wheel is rolling.

Furthermore, the balance beam guide rail system is characterized by an elastic yielding perpendicular to the wheel running surface and can be constructed along the entire curve length of the brake pad in one piece or divided into several areas. Multiple-slot guide rails are also conceivable. Furthermore, the balance beam guide rail system can be composed of individual balance beams, one balance beam being assigned to two friction material blocks respectively. The individual balance beams may be hinged to one another in a form-locking manner to form the balance beam system according to the invention.

Alternatively, the entire balance beam system can be produced as an integrated component, for example, of sectional steel.

In order to ensure that the brake pad will still rest on the wheel running surface, during large lateral displacements of the wheel, the brake shoe laterally has guiding parts toward the wheel face which permit a lateral movement of the brake pad. Preferably, these guide parts are constructed as wear-resistant plates toward the wheel side. In order to be able to carry along the friction material blocks, which are connected with the brake shoe by way of the friction material holding device, synchronously during an axial displacement of the wheel set, it is provided in a special embodiment of the invention that the connecting device to the power unit is further developed such that it permits such a movement. A pendulum suspension of the brake shoe is particularly suitable for this purpose.

Other objects, advantages and novel features of the present invention will become apparent from the following detailed description of the invention when considered in conjunction with the accompanying drawings.

BRIEF DESCRIPTION OF THE DRAWINGS

FIG. 4B is a view of an alternative embodiment with respect to FIG. 4A with a rubber-elastic suspension.

FIG. C is a view of an alternative embodiment with respect to FIG. 4B with a spring-elastic suspension.

DETAILED DESCRIPTION OF THE PREFERRED EMBODIMENTS

Figure 1:
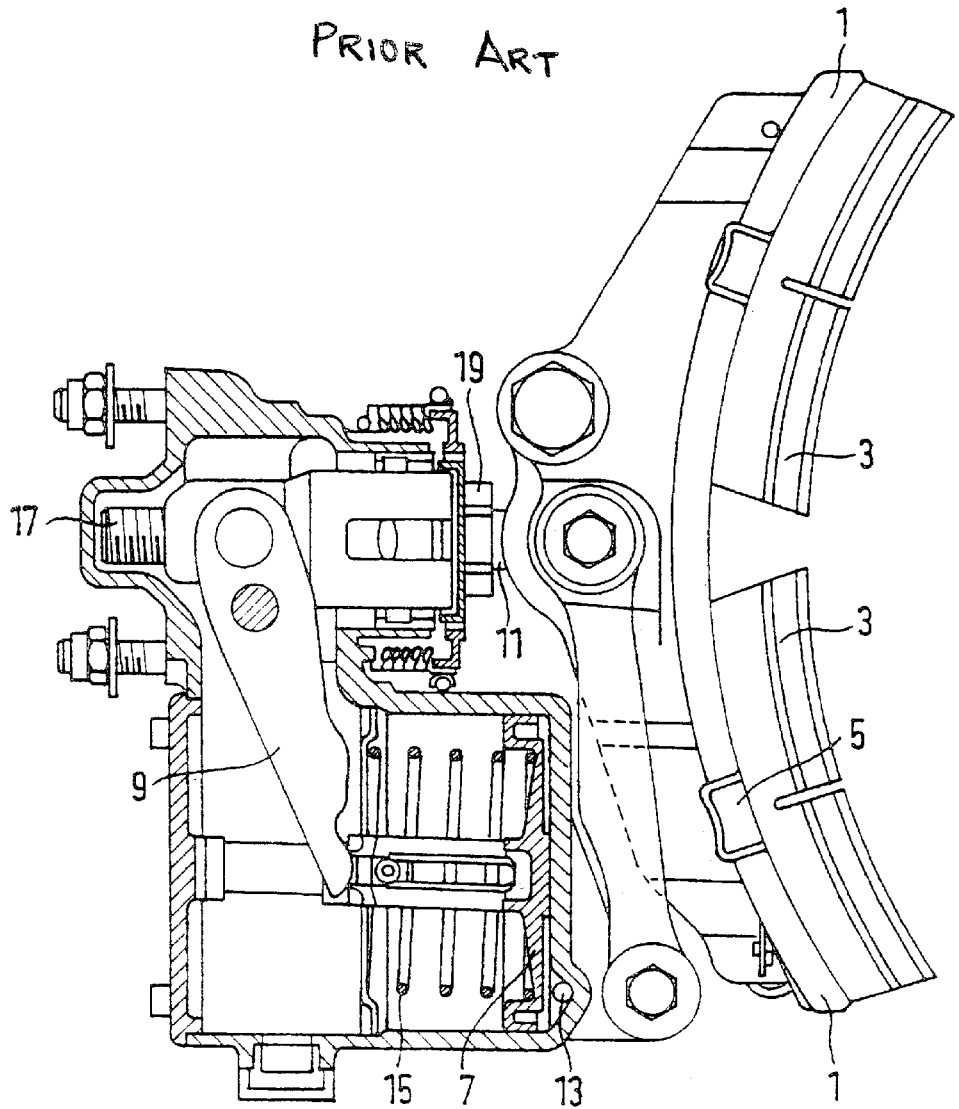
FIG. 1 is a view of a conventional pad brake unit of the prior art.

FIG. 1 illustrates a brake pad unit according to the prior art, specifically the pad brake unit PC 7X constructed and supplied by Knorr-Bremse System Für Schienenfahrzeuge GmbH, in a condition in which the brake cylinder is bled. It comprises two brake pads 3 fastened to the brake shoe 1. The brake pads 3 are fastened in the brake shoe 1 by a form-locking connection of the holding devices 5 arranged on each brake pad 3. The operating system for the pad brake unit comprises a piston 7 and a brake cylinder which operates the connection device 11 of the brake shoe 1 by way of levers 9.

Additional details are the pneumatic connection 13 of the brake cylinder, the pressure spring 15, the wear adjuster 17 as well as the adjusting nut 19.

Figure 2A:
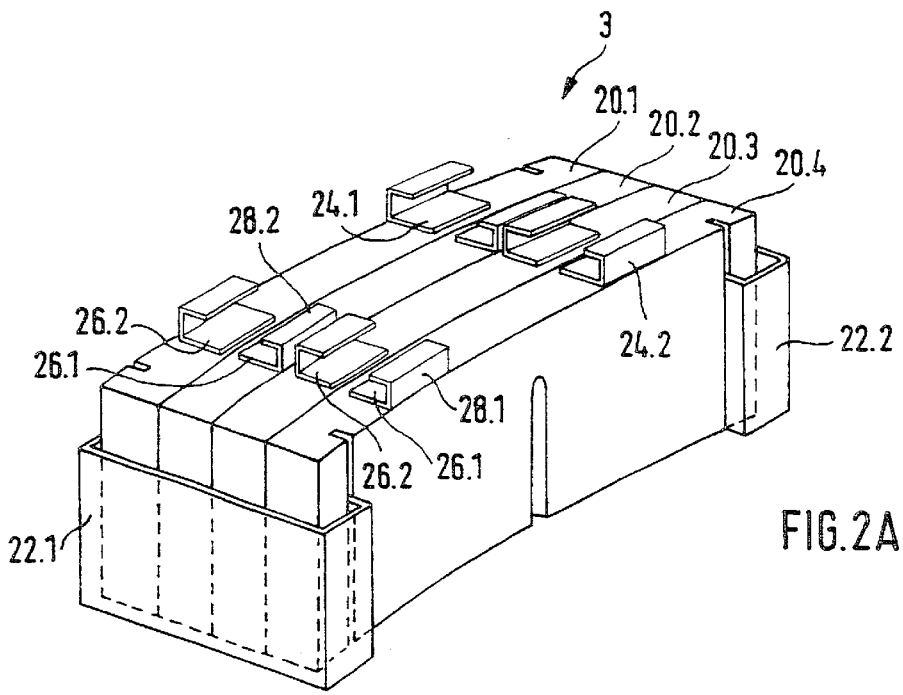
FIG. 2 is a view of a brake pad according to the invention.
FIG. 2B is a view of a first embodiment of the brake pad of the invention according to FIG. 2A with a mechanical connection of the individual friction material blocks.
FIG. 2C is a view of a second embodiment of the invention with mutually connected intermediate layers.

FIG. 2A is a perspective view of an embodiment of a brake pad 3 according to the invention. The brake pad 3 according to the invention is composed of a total of four friction material blocks 20.1, 20.2, 20.3 and 20.4. The individual friction material blocks 20.1, 20.2, 20.3, 20.4 have a lamellar shape and are connected along their longitudinal sides to form the brake pad 3 according to the invention. The multi-disk stack is mechanically connected in the embodiment shown in FIG. 2A by means of sheet metal clamps 22.1, 22.2 for forming a stack. The sheet metal clamps engage in grooves in the respective friction material blocks 20.1, 20.4 situated on the edge of the brake pad.

As a result of the mechanical connection by sheet metal clamps 22.1, 22.2 the individual friction material blocks 20.1, 20.2, 20.3, 20.4 are displaceable with respect to one another, particularly in the vertical direction, that is, perpendicular to the wheel running surface. Because of the displaceability energy is absorbed, the braking noise is reduced and, also in the event of a wear of the wheel running surface or axle displacements, a uniform surface pressure is achieved.

A holding device 24.1 and 24.2 holds the brake pad 3 on the brake shoe 1, and is positioned on each of the individual friction material blocks 20.1, 20.2, 20.3 and 20.4. The holding device 24.1, 24.2 of the brake pad 3 according to the invention on the brake shoe 1, in the illustrated embodiment, is already set up for the friction material holding device 41 according to the invention illustrated in FIGS. 3a and 4A. Naturally, conventional holding devices can also be used which permit a connection of the lamellar brake pad 3 according to the invention with a conventional brake shoe 1.

The holding device 24.1, 24.2 on the brake pad 3 coordinated with the friction material block holding device 41 according to the invention is composed of two reinforcing metal sheets 26.1, 26.2 respectively which have a holding angle 28.1, 28.2.

Each of the sheet metal reinforcements 26.1, 26.2 is non-detachably connected with the respective friction material block 20.1, 20.2, 20.3, 20.4, for example, by means of a glued connection. Mechanical screwed or riveted connections are also conceivable.

Any known friction materials currently used for brake pads, such as gray cast iron, sintered materials, plastic materials or composite materials, can be used as the materials for the individual lamellar friction material blocks 20.1, 20.2, 20.3, 20.4. With respect to possible friction materials, reference is made to "Brakes for Rail Vehicles", Handbook—Brake-Related Terms and Values, Knorr-Bremse AG München.

Figure 2B:
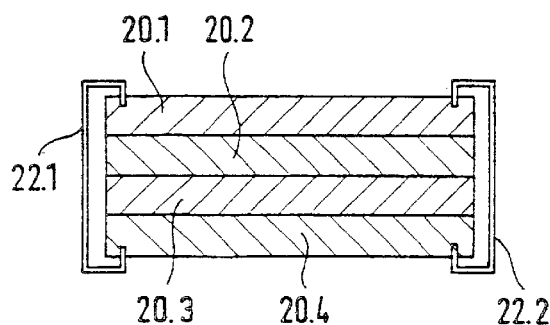
Figure 2C:
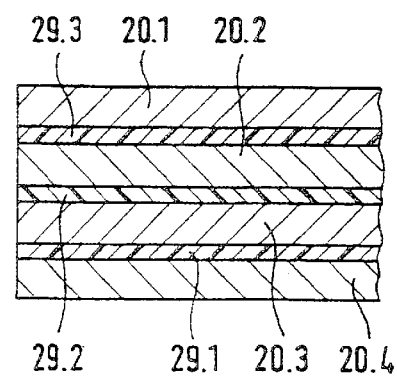

In addition to the embodiment with a mechanical holding of the individual friction materials blocks, which is shown in FIG. 2B, an alternate embodiment, as shown in FIG. 2C, firmly connects the individual friction material blocks 20.1, 20.2, 20.3 and 20.4 with intermediate layers 29.1, 29.2, 29.3. The intermediate layers 29.1, 29.2, 29.3 are elastic layers, for example, adhesive layers made of a corresponding elastic material. Such a layer material may be glued-together sponge rubber. The elastic intermediate layers, in turn, permit the displaceability of the individual disks in the vertical direction, that is, perpendicular to the wheel running surface, so that a uniform surface pressure is achieved.

Likewise, an embodiment is provided in which the intermediate layers 29.1, 29.2 and 29.3 for reducing the wear between the friction material blocks 20.1, 20.2, 20.3, 20.4 are constructed as a sliding layer foil or sliding layer sheet. The wear by abrasion between the friction material blocks 20.1, 20.2, 20.3, 20.4 is thereby reduced during relative movements of the individual friction material blocks.

Layers, sheets or foils made of plastic or aluminum are suitable; the layer can also be applied as a sprayed layer.

In addition to the illustrated embodiment with four parallel disks, embodiments with two, six, or eight disks are also conceivable, while the preferred embodiments do not limit the number of disks per brake pad 3.

Since the elastic intermediate layers 29.1, 29.2, 29.3 of the friction material blocks 20.1, 20.2, 20.3, 20.4 as well as their mechanical connection absorb energy by friction, for example, by the illustrated clamps 22.1, 22.2, the required low noise is achieved during the braking.

Figure 3A:
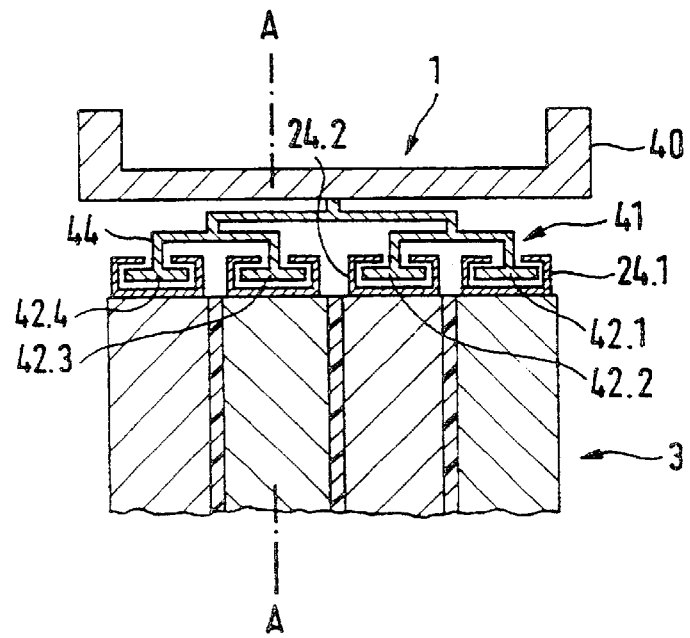
FIG. 3A is a sectional view of the further development according to the invention of the brake shoe with the brake pad fastened thereto.
Figure 3B:
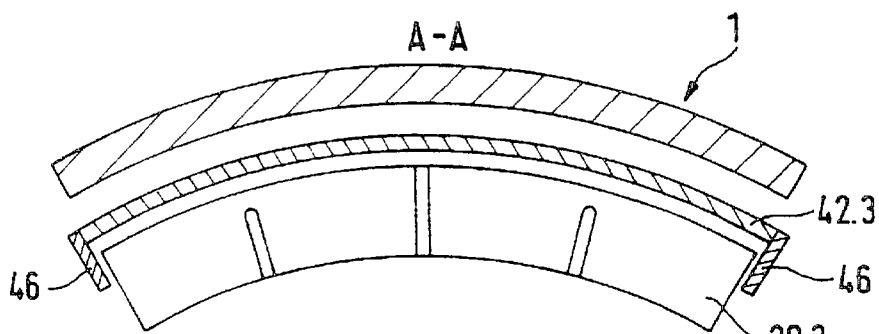
FIG. 3B is a sectional view along Line A—A according to FIG. 3A.
Figure 3C:
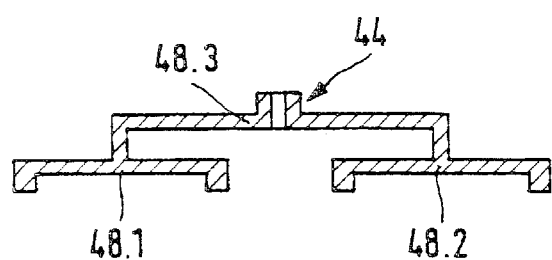
FIG. 3C is a view of a one-piece embodiment of the balance beam system of the brake shoe according to the invention.

FIGS. 3A, 3B and 3C show a particularly low-noise brake shoe 1 according to the invention.

FIG. 3A is a cross-sectional view of a brake shoe 1 according to the invention with a multi-disk brake pad 3 according to the invention arranged thereon, as described in detail with respect to FIGS. 2A to 2C.

Although a particularly low noise level is achieved in combination with the multi-disk brake pad 3, conventional brake pads could also be arranged on the brake shoe 1 described in the following, without deviating from the idea of the invention.

The brake shoe 1 according to the invention comprises a carrier body 40. A connection device (not shown) to the power unit of the brake pad unit, such as the brake cylinder 7 according to FIG. 1, is mounted on the carrier body 40. The connection device can either have a conventional construction or can be constructed in the manner of a pendulum suspension. The latter is of interest particularly for the further developed embodiment of the brake shoe 1 described with respect to FIG. 4.

A friction material block holding device 41 is provided on the carrier body 40 to hold the brake pad 3 in holding devices 24.1, 24.2.

As shown, the friction material holding device 41 comprises a total of four guide rails 42.1, 42.2, 42.3 as well as 42.4 which extend in the wheel turning direction. The guide rails 42.1, 42.2, 42.3, 42.4 are connected with the carrier body 40 by a balance beam system 44. In combination with the balance beam system 44, the guide rails 42.1, 42.2, 42.3, 42.4 permit a displacement of the individual lamellar friction material blocks 20.1, 20.2, 20.3, 20.4 which form the brake pad 3. This displacement is perpendicular to the wheel running surface, so that the individual forces can be kept constant.

As shown in FIGS. 2A–2C, the holding angles 28.1, 28.2 or the u-shaped leaf springs which are part of the disk reinforcement prevent the individual function material blocks 20.1, 20.2, 20.3, 20.4 from falling out or rattling.

The further development of the friction material holding device 41 by means of guide rails 42.1, 42.2, 42.3, 42.4, by means of the balance beam system, permits a displacement in the circumferential direction in addition to the movement of the friction material blocks 20.1, 20.2, 20,3, 20.4 perpendicular to the wheel running surface. The displaceability in the circumferential direction facilitates the mounting of each friction material block 20.1, 20.2, 20,3, 20,4.

As a result of the friction material block holding device 41 according to the invention in combination with the holding device (24.1, 24.2) arranged on the brake pad 3 according to the invention, a movement of the multi-disk brake pad can therefore be carried out in the direction of the wheel running surface in order to adapt to the wheel running surface. In a combined overall effect with the balance beam system 44, this leads to an unexpectedly low noise level and to a very good contact pattern also, for example, in the event of axial displacements. In addition, the capacity of the pad brake is improved by a higher resistance to thermal stress.

FIG. 3B shows the brake shoe 1 and the brake pad 3 along the intersection A—A in FIG. 3A. Identical components as those of FIG. 3A are characterized by the same reference numbers. The friction material block 20.3 is held by the guide rail 42.3 in combination with the holding device] (not shown) and the balance beam system 44. Stops 46 on the guide rails of the respective multi-disk brake pad prevent sliding-out of the friction material block 20.3 in the circumferential direction. Instead of a stop 46, a locking closure (not shown) can be used. The guide rail 42.3 illustrated in FIG. 3B is constructed in one piece along the entire curve length. In an alternative embodiment, which is not shown in this case, guide rails could be implemented only in partial areas or multiple-slot guide rails can be implemented. As a result of their bending-elastic construction, an articulated connection of the balance beams 48.1 and 48.2 is obtained to the balance beam 48.3., as described in the following.

FIG. 3C shows the balance beam system of the friction material block holding device 41 of the brake shoe according to the invention. As clearly illustrated, the balance beam system 44 consists of individual balance beams 48.1, 48.2 and 48.3. The individual balance beams 48.1, 48.2, 48.3 can be connected with one another either mechanically by means of rivets, screws, weld points or form closure. Additionally, they may be constructed in one piece of sectional steel.

Corresponding to the number of holding devices on the multi-disk brake stack, the balance beam system consists of one or several individual balance beams.

Figure 3D:
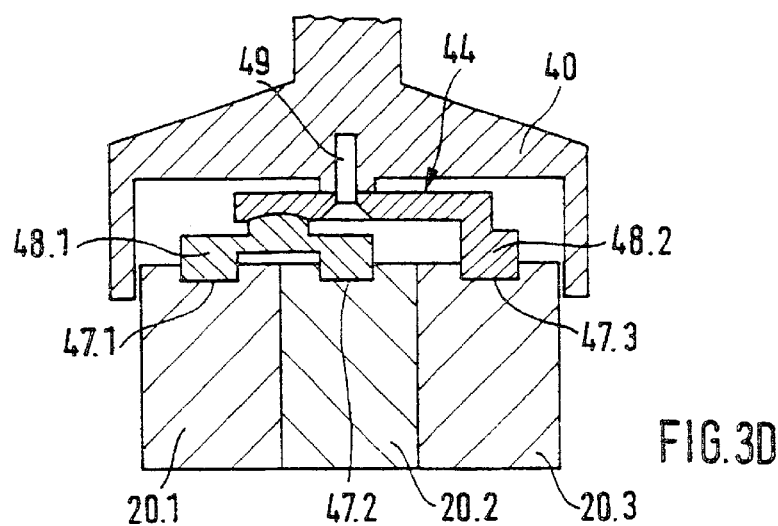
FIG. 3D is a view of a first alternative embodiment of a balance beam suspension according to FIG. 3A.
Figure 3E:
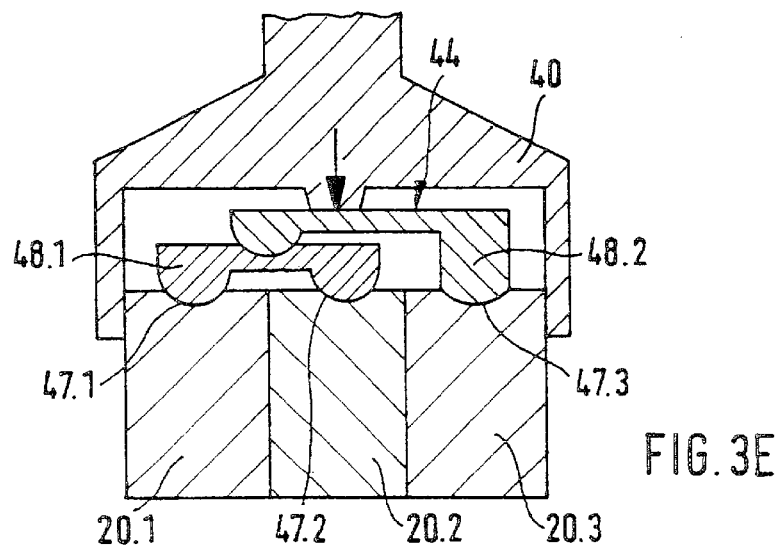
FIG. 3E is a view of a second alternative embodiment of a balance beam suspension according to FIG. 3A.
Figure 3F:
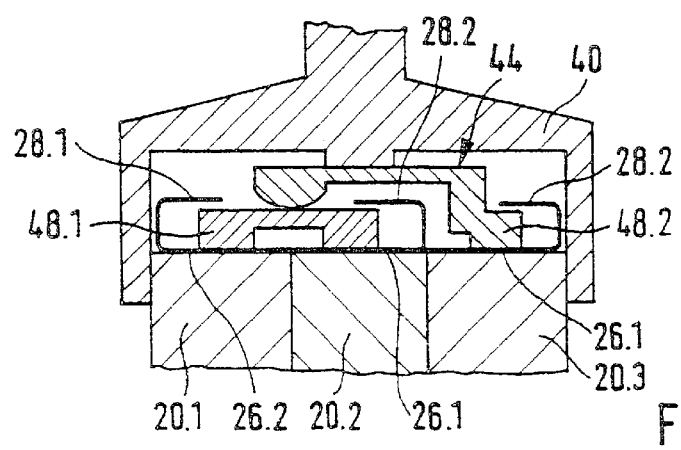
FIG. 3F is a view of a third alternative embodiment of a balance beam suspension according to FIG. 3A.

FIGS. 3D–3F show embodiments in which the balance beam system 44 comprises two balance beams 48.1, 48.2. Identical components as in the preceding figures have the same reference numbers.

In the embodiment according to FIG. 3D, the balance beams 48.1, 48.2 are fastened in recesses 47.1, 47.2, 47.3 of the three friction material blocks 20.1, 20.2, 20.3. The balance beam system 44 is fastened on the carrier body 40 by a pin 49.

FIG. 3E shows an alternative embodiment to FIG. 3D.

As shown in FIG. 3F, the brake pad 3 or the individual friction material elements 20.1, 20.2, 20.3 may be held by means of reinforcement sheets 26.1, 26.2 which, in turn, have holding angles 28.1, 28.4, as illustrated particularly in FIG. 2A.

Figure 4A:
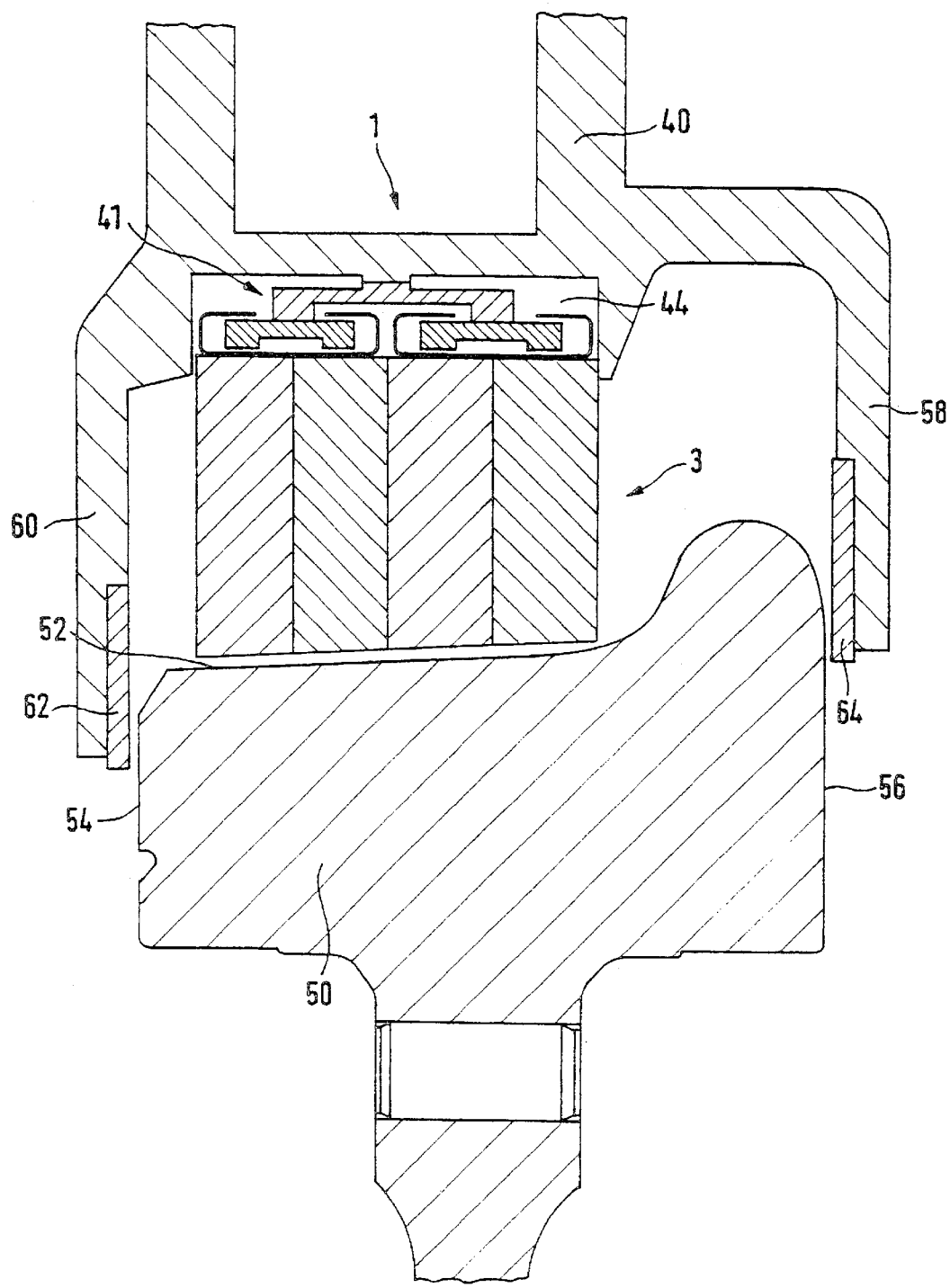
FIG. 4A is a cross-sectional view of an embodiment according to the invention of a brake shoe with a multi-disk brake pad fastened thereto and lateral guide parts.

In a further developed embodiment of the invention illustrated in FIG. 4A, the brake shoe 1 is constructed with lateral guiding surfaces 58, 60 for large lateral movements of the wheel set. Components identical to those of the preceding figures have the same reference numbers in FIG. 4.

FIG. 4A is a cross-sectional view of the system according to the invention as well as the wheel 50 to be braked with the wheel running surface 52. Guiding surfaces 58, 60 are constructed on the carrier body 40 of the brake shoe 1 in the direction of the wheel faces 54, 56. In a preferred embodiment, the guiding surfaces 58, 60 have wear-resistant plates 62, 64. The guiding surfaces 58, 60 act as lateral guiding parts to ensure that, in the event of large lateral displacements of the wheel 50, the brake pad 3 remains on the wheel running surface 52 when the entire unit, namely the brake shoe 1 and the brake pad 3, follows the lateral movement. The individual friction material blocks as well as the balance beam system 44 according to the invention of the friction material block holding device 42 are clearly visible.

In order to permit the moving-along of the brake shoe 1 during a lateral displacement of the wheel 50, the connection device 11 to the operating device must be designed correspondingly, for example, in the form of a pendulum suspension.

In addition to the suspension by means of a balance beam system 44, as an alternative and as illustrated in FIGS. 4B and 4C, a movable suspension of the brake pad 3 with an elastic mat 70 or a corrugated spring steel sheet 72 can be provided. The construction according to FIG. 4C with a corrugated spring steel sheet 72 has the advantage that a biasing effect as well as a balance beam effect is achieved.

The embodiment according to the invention of a lamellar brake pad in combination with the balance beam suspension, an elastic suspension or a spring steel sheet suspension permits a simple mounting of the brake pad similar to the known brake lining fastening in the case of disk brake linings by means of so-called dovetail guides.

Furthermore, a particularly low noise level is achieved during the braking if the elastic intermediate layers of the friction material blocks or disks or the mechanical clamp-type connections absorb energy as a result of the friction between the disks. The horizontal displaceability of the individual friction material blocks permits an optimal adaptation to the wheel running surfaces, for example, in the event of wear because of an axial displacement. The result is a good contact pattern irrespective of the operating conditions. The good contact pattern reduces the forming of corrugations and cracks that generate noise during the rolling of the wheel.

Furthermore, the lateral guiding elements permit a secure contact on the wheel running surface in the event of large axial movements of the wheel set, and prevent a moving-out from the area of the brake pad.

What is claimed is:

1. A rail vehicle brake, comprising:
   at least one brake shoe;
   a power unit for operating the at least one brake shoe, the at least one brake shoe including a carrier body and a connection device connecting the power unit for operating the brake shoe to the at least one brake shoe, and
   a friction material block holding device for holding at least one brake pad on the brake shoe, the holding device having at least two guide rails, in a turning direction of a wheel of the rail vehicle, connected with one another by a balance beam system having individual balance beams hinged to one another, and the brake pad having at least two friction material blocks connected to one another at longitudinal edges.

2. A rail vehicle brake according to claim 1 wherein the brake shoe has lateral surfaces extending toward the face of the wheel.

3. A rail vehicle brake according to claim 2 wherein the connection device connecting the brake shoe to the power unit is further developed such that, during axial movements of the wheel set, the brake shoe is guided by the lateral surfaces.

4. A rail vehicle brake according to claim 3, wherein the connection device comprises a pendulum suspension.

5. A rail vehicle brake according to claim 2, wherein the lateral surfaces are wear-resistant plates facing toward the wheel side.

6. A rail vehicle brake according to claim 1, wherein the entire balance beam system is an integrated bending-elastic component.

7. A rail vehicle brake according to claim 6, wherein the integrated component is made of sectional steel.

8. A rail vehicle brake according to claim 1, wherein the friction material block holding device has at least one spring element, and displaceably guides the at least one frictional material block on the brake shoe.

9. A brake shoe according to claim 8, wherein the friction material block is biased by the spring element in an operating direction.

10. The rail vehicle brake according to claim 1, wherein the connection device is a pendulum suspension.

11. A brake pad for rail vehicles, comprising:
    at least two friction material blocks having longitudinal sides;
    at least one holding device mounted on the friction material blocks for fastening the friction material blocks to a brake shoe;
    wherein the individual friction material blocks are lamellar in shape, and are connected with one another along the longitudinal sides by one of a mechanical connection and a shear elastic intermediate layer to form a brake pad, the shear elastic intermediate layer being one of a sliding layer, a sliding metal sheet and a sliding foil; and
    wherein the connection is constructed such that the individual friction material blocks may be displaced with respect to one another.

12. A brake pad according to claim 11, further comprising a holding device assigned to each friction material block.

13. A brake pad according to claim 12, wherein the holding device is a sheet metal reinforcement facing the brake shoe and has holding angles.

14. A brake pad according to claim 11, wherein the shear-elastic intermediate layer connection is one of an adhesive layer or an intermediate layer glued to the friction material blocks.

15. A brake pad according to claim 11, wherein the mechanical connection is one of a screwed, riveted or form-locking clamp-type connection.

16. A brake shoe for engaging a wheel of rail vehicles, comprising:

a carrier body;

a connection device connecting a power unit for operating the brake shoe;

a friction material holding device for holding at least one brake pad on the brake shoe, the brake pad comprising at least two friction material blocks connected to one another at longitudinal edges;

wherein the friction material block holding device comprises at least two guide rails in the turning direction of the wheel, the at least two guide rails connected with one another by a balance beam system and adapted to permit a displacement of the individual friction material blocks perpendicular to a running surface of the wheel so that individual forces can be kept constant.

17. The brake shoe of claim 16, wherein the connection device is a pendulum suspension.

18. A brake pad for rail vehicles, comprising:

at least two friction material blocks having longitudinal sides;

a separate holding device assigned to each friction material block;

wherein, the individual friction material blocks are lamellar in shape, and are connected with one another along the longitudinal sides by one of a mechanical connection or a shear-elastic intermediate layer to form a brake pad.

* * * * *